June 12, 1934. J. C. MacLACHLAN 1,962,781
SPRAYING HEAD
Filed May 31, 1930
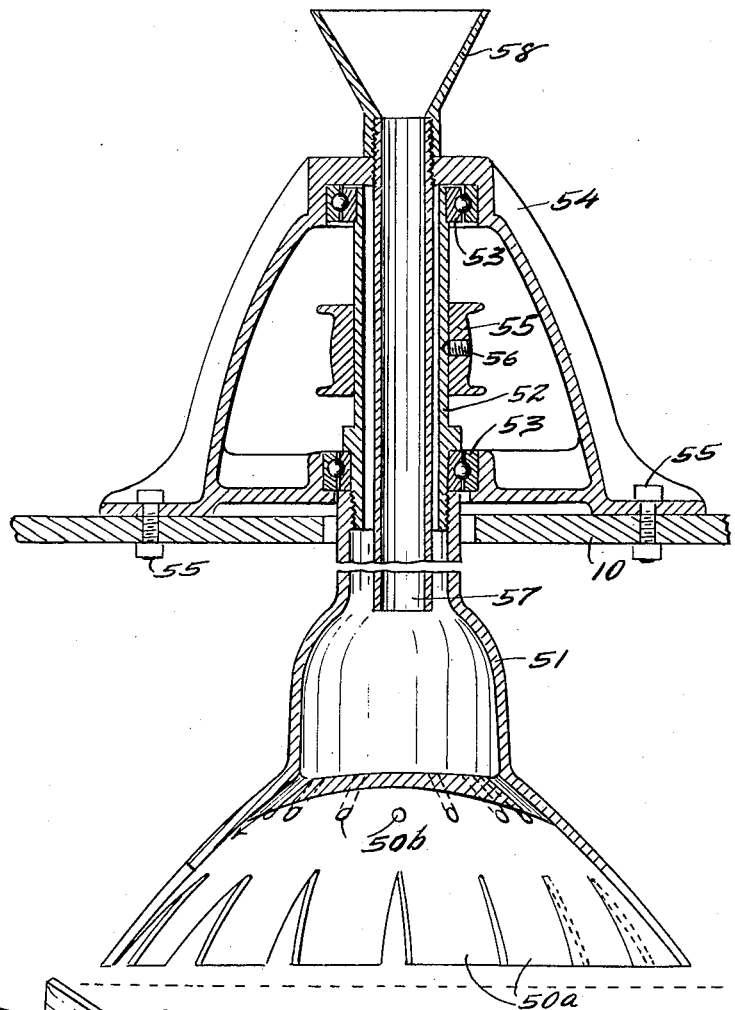
Fig. I.
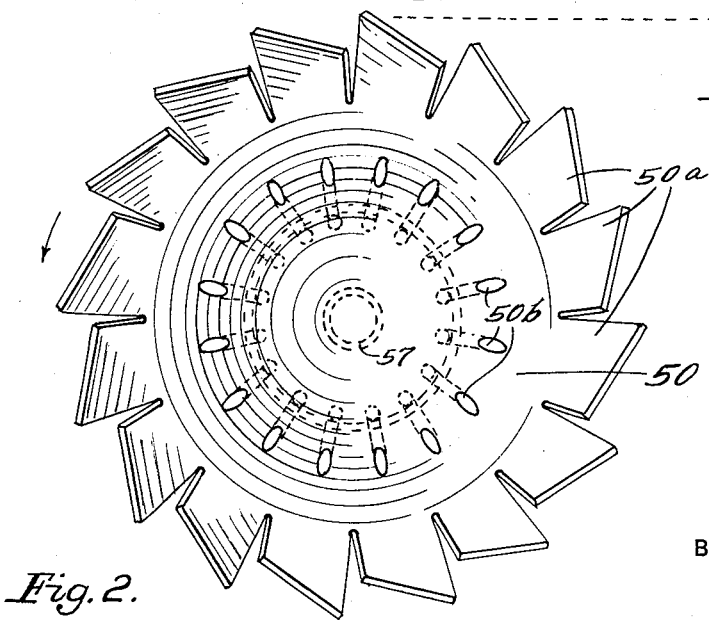
Fig. 2.
INVENTOR
JOHN C. MacLACHLAN
BY Reif & Paddock
HIS ATTORNEYS Patented June 12, 1934

1,962,781

UNITED STATES PATENT OFFICE 1,962,781

SPRAYING HEAD

John C. MacLachlan, Minneapolis, Minn., assignor to George D. Kimball, Chicago, Ill.

Application May 31, 1930, Serial No. 458,025

7 Claims. (Cl. 299—63)

This invention relates to apparatus for finely dividing and drying liquid material, such as milk and other fluid and semi-fluid material. The commercial drying of milk and similar material has now reached rather large proportions and it is desirable to have simple and efficient drying apparatus which will quickly and effectively dry the material. In some respects, this application is an improvement upon the apparatus shown in applicant's Patent #1,742,478, granted January 7th, 1930 on "Distributing head for drying apparatus", said patent disclosing a disc having blades thereon for distributing material, together with a cup at the under side of said disc to which the liquid was fed. It was found in practice that this cup had to be made of large size to accommodate sufficient material and it thus became objectionable and was in the way.

It is an object of this invention to provide a simple and efficient distributing head having ample provision for receiving sufficient material, the material being received in a receptacle which does not in any way interfere with the proper operation of the device.

It is a further object of the invention to provide a distributing head comprising a concavo-convex disc to which the liquid is delivered without impact, said disc having a chamber disposed thereabove and preferably centrally thereof to which the liquid is delivered, said liquid being delivered from said chamber to the under side of said disc.

It is a further object of the invention to provide a distributing head comprising a concavo-convex disc having a plurality of angularly disposed blades at its edge, said disc having a chamber disposed centrally thereabove for receiving the liquid and having a plurality of comparatively small holes extending therethrough substantially tangentially of the under side of the disc through which liquid is delivered to the disc, said chamber having a tubular portion extending upwardly through which extends a stationary feed pipe.

These and other objects and advantages of the invention will be fully set forth in the following description made in connection with the accompanying drawing wherein like reference characters refer to similar parts throughout the several views and wherein, Fig. 1 is a central vertical section taken through the distributing head and feeding means; and Fig. 2 is a bottom plan view of the distributing head.

The centrifugal liquid separating and distributing means forming the subject matter of this invention is constructed and arranged to be disposed adjacent the top of a drying cabinet only the top portion of which is shown and designated 10. Said distributing means is preferably placed at the center of said cabinet and comprises a concavo-convex disc 50 having its concave side disposed downwardly. The disc 50 is slitted adjacent its edge on outwardly extending lines, thus forming tongues or blades 50a, said blades being twisted about substantially central axes so that they extend at an angle to each other and at an angle to the inner surface of the disc, as shown in Fig. 5. The blades are thus spaced with V-shaped spaces therebetween. The disc 50 has extending upwardly and centrally from its top side, a casing 51 and while this casing could be separately made and welded to the disc 50, in the embodiment of the invention illustrated, it is shown as integral with the disc. Casing 51 at its upper end is threaded onto a tubular member 52, which member is journaled in ball bearings 53 carried in the frame or bracket 54 secured by suitable bolts or screws 55 to the top of the cabinet 10. Tube 52 has a pulley 55 secured thereto as by the set screw 56, which pulley will receive a belt extending to a suitable motor driven pulley not shown, whereby pulley 55 and tube 52 can be rotated at high speed. A feed pipe 57 is secured in stationary position in the top of bracket 54 and extends downwardly through member 52 and to the top of casing 51. Said tube 57 has a funnel 58 secured to its top. Disc 50 has a plurality of holes 50b formed therein, the same extending parallel to and close to the under side of disc 50 and substantially tangentially thereof.

In operation the milk to be dried is delivered to funnel 58. In practice, the funnel and tube 57 are connected to a pipe leading from a heating device. It is the common practice to condense the milk somewhat before delivering it to the drier and the milk is delivered to the heater from the condenser and taken off continuously to be supplied to the drier. The milk passes down into the chamber in casing 51, which forms a container for the milk to be dried. Pulley 55 is driven at very high speed so that member 52, casing 51 and disc 50 are rotated at high speed. The milk passes from the chamber and casing 51 through holes 50b and is delivered gently and without impact to the under side of disc 50. The milk is disposed over the surfaces of the blades 50a and forms a thin film thereon some of the milk passing to the outer sides of the blades. As disc 50 rotates, a current of air is set up owing to the fan action of the blades 50a and air passes at high velocity between the blades 50a. This action of the air and the high speed of rotation of disc 50 results in a very fine separation of the milk and the milk is discharged from disc 50 in an exceedingly finely divided condition and thrown outwardly and downwardly in an umbrella-like shower. While the milk is very finely divided, it is divided without impact and the natural globules or fat globules in the milk are not broken. In the drying operation in the drying cabinet heated air is passed through the shower of material and the particles are substantially instantaneously dried and fall to the bottom of the cabinet where the material collects in the form of a fine dry powder.

From the above description, it is seen that applicant has provided a simple and improved apparatus for quickly and efficiently drying milk or similar liquid or semi-liquid substances. The total cross sectional area of the holes 50b is made considerably greater than the cross sectional area of the pipe 57. The milk delivered to casing 51 can thus be well taken care of and distributed by the disc 50. There is nothing below the disc 50 or at the concave side thereof to interfere in any way with the operation of the disc. The disc 50 and casing 51 can be very neatly and compactly made and the distributing head is thus quite simple in construction. The milk is continuously discharged and the apparatus can be kept in continuous operation for hours. The various features and improvements of the device have been worked out from actual practice and operation of the drying apparatus and it is obvious that the same will have a high degree of utility for the purpose intended.

It will, of course, be understood that various changes may be made in the form, details, arrangement and proportions of the parts without departing from the scope of applicant's invention, which, generally stated, consists in a device capable of carrying out the objects set forth in the novel parts and combination of parts disclosed and defined in the appended claims.

What is claimed is:

1. A spraying head for finely dividing and distributing liquid, comprising a disc having spaced blades formed at its edge, a bell-shaped casing disposed above and integral with said disc having an unobstructed chamber therein for receiving material to be sprayed, a plurality of openings leading from said chamber to the under side of said disc for delivering material to said under side, and means for rotating said disc and casing and a stationary feed pipe extending axially of said chamber for delivering material to the upper portion of said casing.

2. A spraying head for finely dividing and distributing liquid, comprising a concavo-convex disc, a substantially bell-shaped casing above and integral with said disc having a chamber therein, said casing having an upwardly extending tubular portion closed at its upper end, means for supporting said portion, means for rotating said casing and disc at a high speed, said disc having a plurality of openings leading from said chamber to the under side thereof and delivering liquid to said under side without impact and a feed pipe extending into said tubular portion for delivering liquid to said chamber.

3. A spraying head for finely dividing and distributing liquid such as milk, comprising a disk provided with a concave under surface throughout its whole extent having spaced blades formed at its edge and extending substantially vertically at its central portion to form a chamber of comparatively large capacity, said disk having a substantially horizontal portion at the bottom of said chamber, said horizontal portion having a plurality of holes extending downwardly and outwardly therethrough at the bottom of said chamber, one side of said holes being tangential to the concave side of said disk, said holes and the radial elements of said concave side extending in a substantially straight line to said blades, and a feed pipe delivering to the upper end of said chamber.

4. A spraying head for finely dividing and distributing liquid such as milk for drying having in combination, circumferentially spaced members extending outwardly and downwardly at the lower portion of said head, feeding means for said head comprising an intermediate portion of smaller diameter than said spaced members disposed above the same and having a chamber therein, a member forming the bottom of said chamber, said member having circumferentially spaced passages leading outwardly therein from the bottom of said chamber through which material is thrown and passes to said spaced members to be disintegrated thereby.

5. A spraying head for finely dividing and distributing liquid such as milk for drying having in combination, circumferentially spaced members extending outwardly and downwardly at the lower portion of said head, feeding means for said head comprising an intermediate portion of smaller diameter than said spaced members disposed above the same and having a chamber therein, a member forming the bottom of said chamber, having a substantially flat top surface, said member having a plurality of circumferentially spaced passages leading outwardly at the bottom of said chamber and at said surface through which the material is thrown, which material passes to said spaced members to be disintegrated thereby.

6. The structure set forth in claim 4, said head having a tubular means leading upwardly from said chamber through which material passes, said chamber and member being of much greater diameter than said tubular means.

7. A spraying head for projecting and finely dividing liquid material such as milk for drying, having in combination, circumferentially spaced members extending outwardly and downwardly at the outer and lower portion of said head, feeding means for said head comprising an intermediate portion of smaller diameter than said spaced members disposed above the same and having a comparatively large chamber therein, said chamber having a substantially horizontal bottom and circumferentially spaced passages leading outwardly from said bottom through which material is thrown and passes to said spaced members to be disintegrated thereby.

JOHN C. MacLACHLAN.